US008224644B2

(12) United States Patent
Krumel et al.

(10) Patent No.: US 8,224,644 B2
(45) Date of Patent: Jul. 17, 2012

(54) UTTERANCE PROCESSING FOR NETWORK-BASED SPEECH RECOGNITION UTILIZING A CLIENT-SIDE CACHE

(75) Inventors: Andrew K. Krumel, Redmond, WA (US); Shuangyu Chang, Fremont, CA (US); Robert L. Chambers, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 862 days.

(21) Appl. No.: 12/337,810

(22) Filed: Dec. 18, 2008

(65) Prior Publication Data
US 2010/0161328 A1    Jun. 24, 2010

(51) Int. Cl.
G10L 15/00    (2006.01)
(52) U.S. Cl. .................................................. 704/236
(58) Field of Classification Search .............. 704/236
See application file for complete search history.

(56) References Cited

U.S. PATENT DOCUMENTS

| | | | |
|---|---|---|---|
| 6,523,061 B1 | 2/2003 | Halverson et al. | |
| 6,745,161 B1 | 6/2004 | Arnold et al. | |
| 7,013,275 B2 | 3/2006 | Arnold et al. | |
| 7,228,277 B2 | 6/2007 | Nagashima | |
| 7,401,132 B1 * | 7/2008 | Krumel et al. | 709/220 |
| 7,747,782 B2 * | 6/2010 | Hunt et al. | 709/246 |
| 2003/0177009 A1 * | 9/2003 | Odinak et al. | 704/260 |
| 2007/0067305 A1 | 3/2007 | Ives et al. | |
| 2008/0005057 A1 | 1/2008 | Ozzie et al. | |

OTHER PUBLICATIONS

Michael Mace: "Mobile Opportunity", Web 3.0, Oct. 14, 2008, pp. 1-9 http://mobileopportunity.blogspot.com/2005/11/web-30.html.
Acero et al.: "Live Search for Mobile: Web Services by Voice on the Cellphone"; Microsoft Corporation, ICASSP 2008. pp. 5256-5259. http://ieeexplore.ieee.org/stamp/stamp.jsp?arnumber=4518845 &isnumber=4517521.
Ashutosh Morde et al.: "A Multimodal System for Accessing Driving Directions"; DAS 2002, LNCS 2423, pp. 556-567, 2002. http://www.springerlink.com/content/tg3w66jjfu1vahuk/fulltext.pdf.
Markku Turnen et al.: "Spoken and Multimodal Communication Systems in Mobile Settings", A. Esposito et al. (Eds.) Verbal and Nonverbal Commun. Behaviours, LNAI 4775, pp. 227-241, 2007. http://www.springerlink.com/content/75t7x54587827240/fulltext.pdf.

* cited by examiner

*Primary Examiner* — Susan McFadden
(74) *Attorney, Agent, or Firm* — Merchant & Gould

(57) ABSTRACT

Embodiments are provided for utilizing a client-side cache for utterance processing to facilitate network based speech recognition. An utterance comprising a query is received in a client computing device. The query is sent from the client to a network server for results processing. The utterance is processed to determine a speech profile. A cache lookup is performed based on the speech profile to determine whether results data for the query is stored in the cache. If the results data is stored in the cache, then a query is sent to cancel the results processing on the network server and the cached results data is displayed on the client computing device.

16 Claims, 5 Drawing Sheets

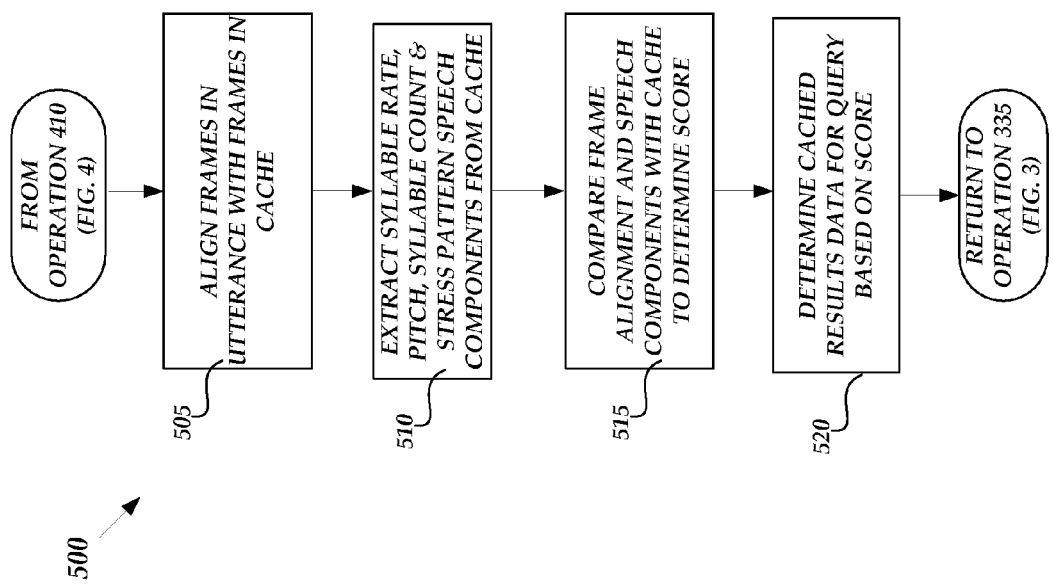

UTTERANCE PROCESSING FOR NETWORK-BASED SPEECH RECOGNITION UTILIZING A CLIENT-SIDE CACHE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Mobile computing devices, such as cellular telephones, utilize speech recognition technology to perform various voice-activated functions such as dialing and information queries. For example, a networked computing device may send a voice query to a voice portal platform for directory assistance, customer service, financial, travel, e-commerce, or theater information. The voice portal utilizes speech recognition techniques to process voice queries received over a network (such as the Internet) from the mobile computing device, determines an appropriate result, and returns the result back to the computing device. Current methods of utilizing network-based speech recognition however, suffer from a number of drawbacks including network latency and downtime. Thus, when latency in a network is high or the network is down, the roundtrip time for the receipt of results from a voice query is delayed or interrupted causing the user of a mobile computing device who made the query to be inconvenienced. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for utilizing a client-side cache for utterance processing to facilitate network based speech recognition. An utterance comprising a query is received in a client computing device. The query is sent from the client to a network server for results processing. The utterance is processed to determine a speech profile. A cache lookup is performed based on the speech profile to determine whether results data for the query is stored in the cache. If the results data is stored in the cache, then a query is sent to cancel the results processing on the network server and the cached results data is displayed on the client computing device.

These and other features and advantages will be apparent from a reading of the following detailed description and a review of the associated drawings. It is to be understood that both the foregoing general description and the following detailed description are illustrative only and are not restrictive of the invention as claimed.

BRIEF DESCRIPTION OF THE DRAWINGS

FIG. 5 is a flow diagram illustrating a routine for performing a lookup based on a speech profile to determine whether results for a query comprising an utterance are stored in a cache, in accordance with an embodiment.

DETAILED DESCRIPTION

Embodiments are provided for utilizing a client-side cache for utterance processing to facilitate network based speech recognition. An utterance comprising a query is received in a client computing device. The query is sent from the client to a network server for results processing. The utterance is processed to determine a speech profile on the client computing device. A cache lookup is performed based on the speech profile to determine whether results data for the query is stored in the cache. If the results data is stored in the cache, then a query is sent to cancel the results processing on the network server and the cached results data is displayed on the client computing device.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
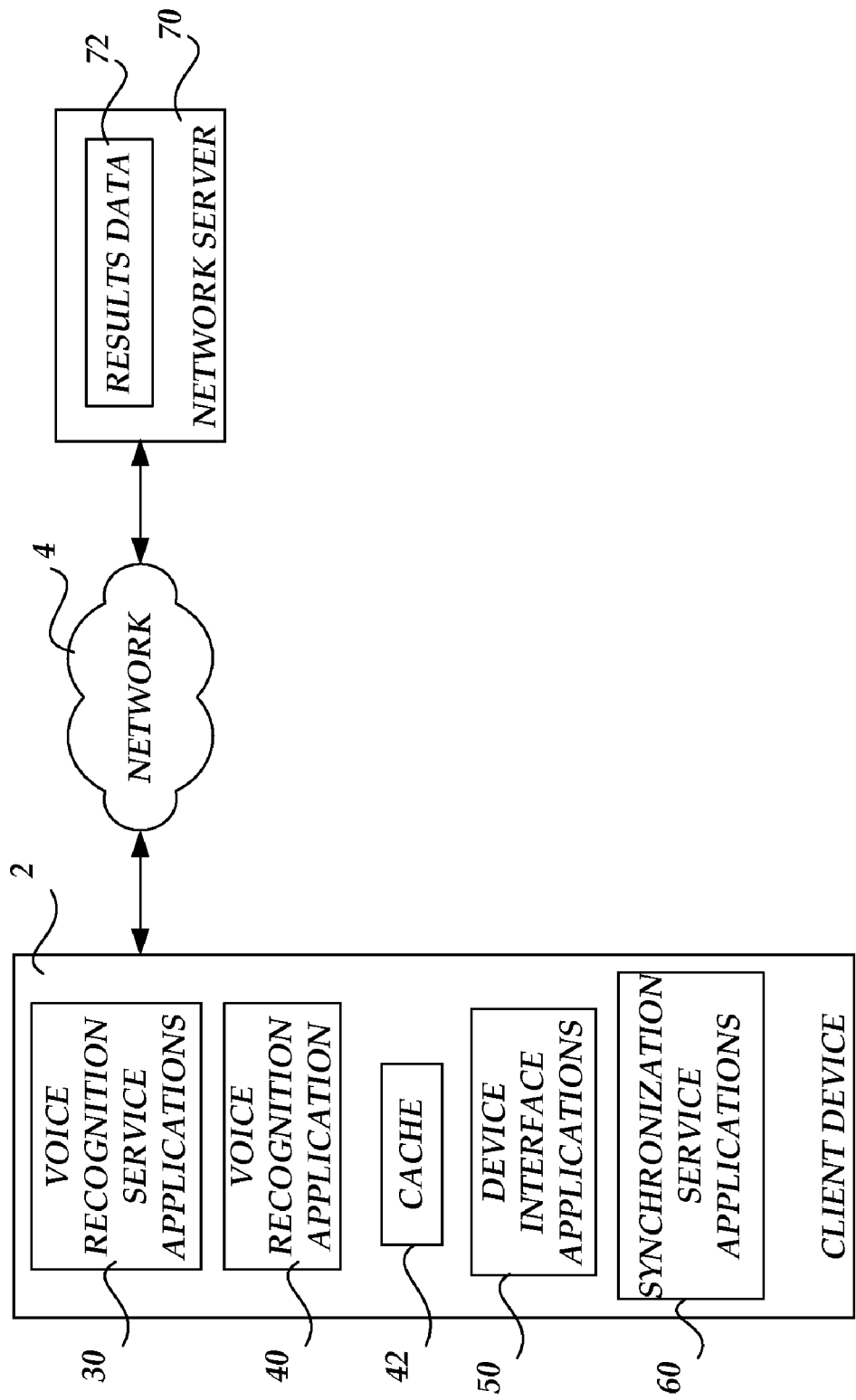
FIG. 1 is a block diagram illustrating a network architecture for utilizing a cache for utterance processing to facilitate network based speech recognition, in accordance with various embodiments.

Referring now to the drawings, in which like numerals represent like elements through the several figures, various aspects of the present invention will be described. FIG. 1 is a block diagram illustrating a network architecture for utilizing a cache for utterance processing to facilitate network based speech recognition, in accordance with various embodiments. The network architecture includes a client computing device 2 in communication with a network server 70 over a network 4. The client computing device 2 may include speech recognition service applications 30, a speech recognition application 40, a cache 42, device interface applications 50 and synchronization service applications 60. In accordance with various embodiments, the client computing device 2 may include a mobile or portable computer or other type of computer capable of executing one or more application programs including, but not limited to, a laptop computer, a "smartphone" (i.e., a mobile phone having computer functionality and/or which is capable of running operating system software to provide a standardized interface and platform for application developers), and an automobile-based computing device.

The speech recognition server applications 30 in the client computing device 2 may include various productivity software applications which may utilize speech recognition including, but not limited to, search engines (e.g., a business search), navigation, voice activated dialing ("VAD"), messaging, media, and content. In accordance with various embodiments (which will be described in greater detail in the discussion of FIGS. 3-5), the speech recognition application 40 may be utilized to receive a query from the client device 2 (e.g., a user may initiate a query for information in one of the speech recognition service applications 30) and utilize parallel processing to both send the query to the network server 70 and process the query using the cache 42, for a result or answer. If the speech recognition application 40 determines that the result of the query is in the cache 42, then a request is sent to the network server 70 to stop processing directed towards finding the query result.

As discussed above, the cache 42 may be utilized by the speech recognition application 40 to process a query, received from the client device 2, for a stored result. In particular, the cache 42 may be utilized by the speech recognition application 40 to store results data from previous queries received from the network server 70 as well as to store speech components and other data which may be accessed by the speech recognition application 40 to determine whether the stored results data corresponds to a currently received query. The cache 42 will be described in greater detail below in the discussion of FIGS. 3-5.

The device interface applications 50 in the client computing device 2 may include application program interfaces ("APIs") for various functions which may be performed by the client computing device 2 including, but not limited to, generating a user interface, networking, audio capture, speech recognition (i.e., an embedded speech recognizer), audio playback, camera, address book, and global positioning system ("GPS") functions. The synchronization service application 60 in the client computing device 2 facilitates the synchronization of the client computing device 2 with the network server 2.

The client computing device may communicate with the network server 70 over the network 4 which may include a local network or a wide area network (e.g., the Internet). In accordance with an embodiment, the network server 70 may comprise a plurality of computing devices in a data center for receiving a voice query from the client computing device 2, recognizing the query, and returning results data 72 back to the client computing device in response to the query. The plurality of computing devices (not shown) comprising the network server 70 may include, but are not limited to, an application gateway, an application server, a synchronization gateway and a recognition POD or replication device. It should be appreciated by those skilled in the art that communication between the plurality of computing devices comprising the network server 70 and the client computing device 2 may be facilitated by the use of a number of network protocols. For example, secure data communication between the client computing device 2 and the application gateway may be facilitated by the use of the transmission control protocol ("TCP") and the HyperText Transfer Protocol over Secure Socket Layer protocol ("HTTPS"). Communication between the application gateway, the application server, and the recognition POD may be facilitated by the use of the HyperText Transfer Protocol ("HTTP"). The aforementioned protocols are well-known to those skilled in the art and therefore are not discussed further herein. In accordance with an embodiment, the voice query received by the network server 70 and the results data 72 may be processed using the HTTP POST method (with audio) (e.g., by the application gateway prior to being sent to the recognition POD and the application server). The network server 70 (e.g., via the application server) may also convert the results data 72 into a markup language document prior to communicating the results data 72 to the client computing device 2 (in accordance with this embodiment, the speech recognition application 40 may include a markup language interpreter (not shown) for processing the markup language document comprising the results data 72. In accordance with an embodiment, the results data 72 may be compressed using one or more compression methods prior to being communicated to the client computing device 2. Examples of compression methods which may be utilized in various embodiments are the well-known Wireless Application Protocol Binary Extensible Markup Language ("WBXML") and GNU zip ("GZIP") compression methods.

Exemplary Operating Environment

Figure 2:
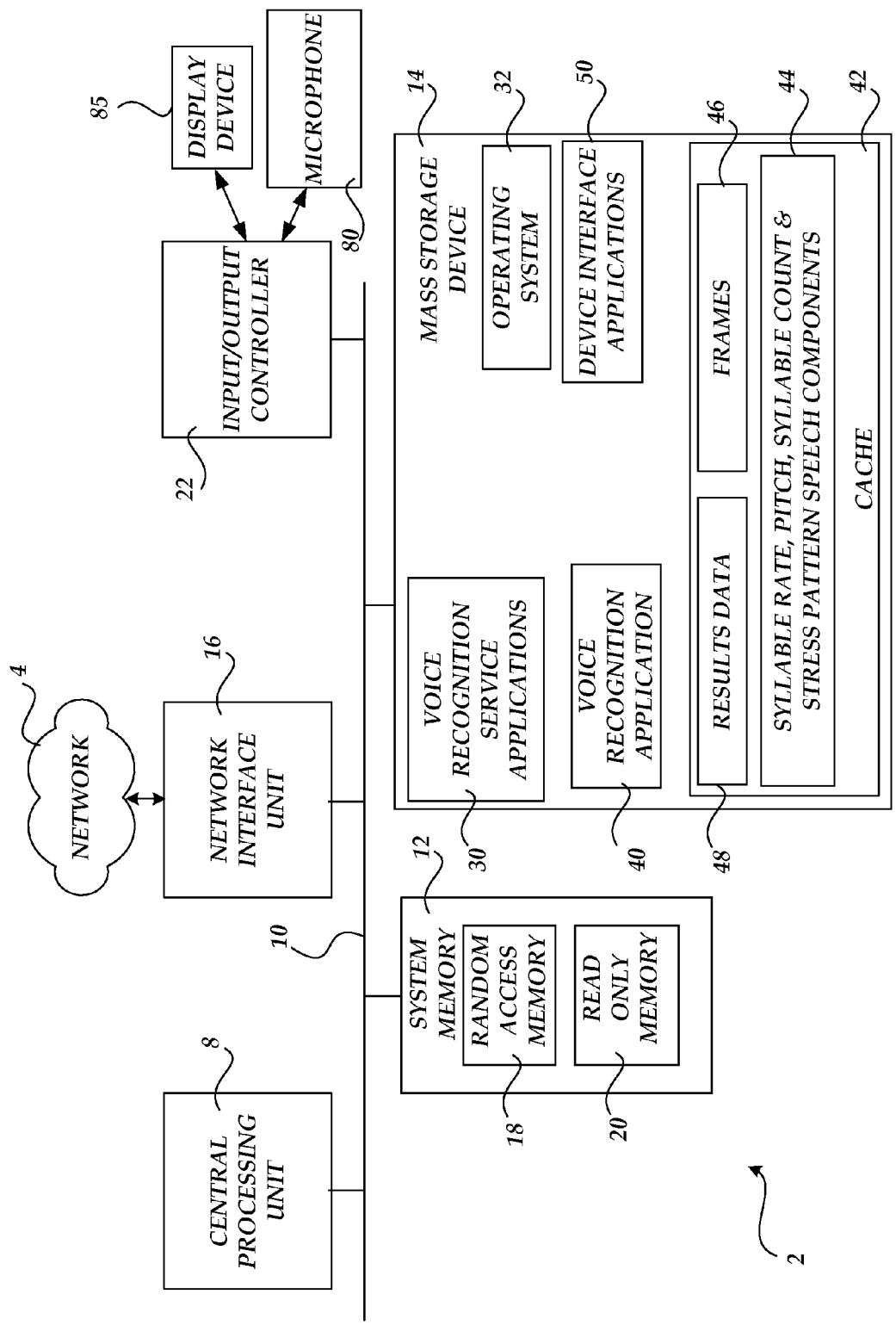
FIG. 2 is a block diagram illustrating a client computing environment which may be utilized for utilizing a cache for utterance processing to facilitate network based speech recognition, in accordance with various embodiments.

Referring now to FIG. 2, the following discussion is intended to provide a brief, general description of a suitable computing environment in which various illustrative embodiments may be implemented. While various embodiments will be described in the general context of program modules that execute in conjunction with program modules that run on an operating system on a computing device, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with a number of computer system configurations, including hand-held devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 2 shows the client computing device 2 which may include a mobile or portable computer or other type of computer capable of executing one or more application programs including, but not limited to, a laptop computer, a "smartphone" (i.e., a mobile phone having computer functionality and/or which is capable of running operating system software to provide a standardized interface and platform for application developers), and an automobile-based computing device. The client computing device 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The client computing device 2 further includes a mass storage device 14 for storing an operating system 32, the speech recognition service applications 30, the speech recognition application 40, the cache 42, the device interface applications 50, and the synchronization applications 60. The cache 42 may include syllable rate, pitch, syllable count, and stress pattern speech components 44 (hereinafter referred to as the speech components 44), frames 46 and results data 48. The frames 46 may include numerical sequences which comprise one or more previously received utterances (e.g., each frame may represent thirty milliseconds of the utterance) from a user of the client computing device 2. The results data 48 may include query results received from the network server 70 for previously sent queries from the client computing device 2 to the network server 70. As will be described in greater detail below, the syllable rate, pitch, syllable count, and stress pattern speech components 44, frames 46 and results data 48 may be utilized by the speech recognition application 40 to determine whether the stored results data corresponds to a currently received query.

In accordance with various embodiments, the operating system 32 may be suitable for controlling the operation of a networked personal computer, such as the WINDOWS operating systems from MICROSOFT CORPORATION of Redmond, Wash. The mass storage device 14 is connected to the CPU 8 through a mass storage controller (not shown) connected to the bus 10. The mass storage device 14 and its associated computer-readable media provide non-volatile storage for the client computing device 2. Although the description of computer-readable media contained herein refers to a mass storage device, such as a hard disk or CD-ROM drive, it should be appreciated by those skilled in the art that computer-readable media can be any available media that can be accessed or utilized by the client computing device 2. By way of example, and not limitation, computer-readable media may comprise computer storage media and communication media.

Computer storage media includes volatile and non-volatile, removable and non-removable hardware storage media implemented in any physical method or technology for the storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, which can be used to store the desired information and which can be accessed by the client computing device 2. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as a computer program product.

According to various embodiments of the invention, the client computing device 2 may operate in a networked environment using logical connections to remote computers through the network 4 which, as discussed above, may include a local network or a wide area network (e.g., the Internet). The client computing device 2 may connect to the network 4 through a network interface unit 16 connected to the bus 10. It should be appreciated that the network interface unit 16 may also be utilized to connect to other types of networks and remote computing systems. The client computing device 2 may also include an input/output controller 22 for receiving and processing input from a number of input types, including a microphone 80 as well as a keyboard, mouse, pen, stylus, finger, and/or other means (not shown). Similarly, an input/output controller 22 may provide output to a display device 70 as well as a printer, or other type of output device (not shown).

Figure 3:
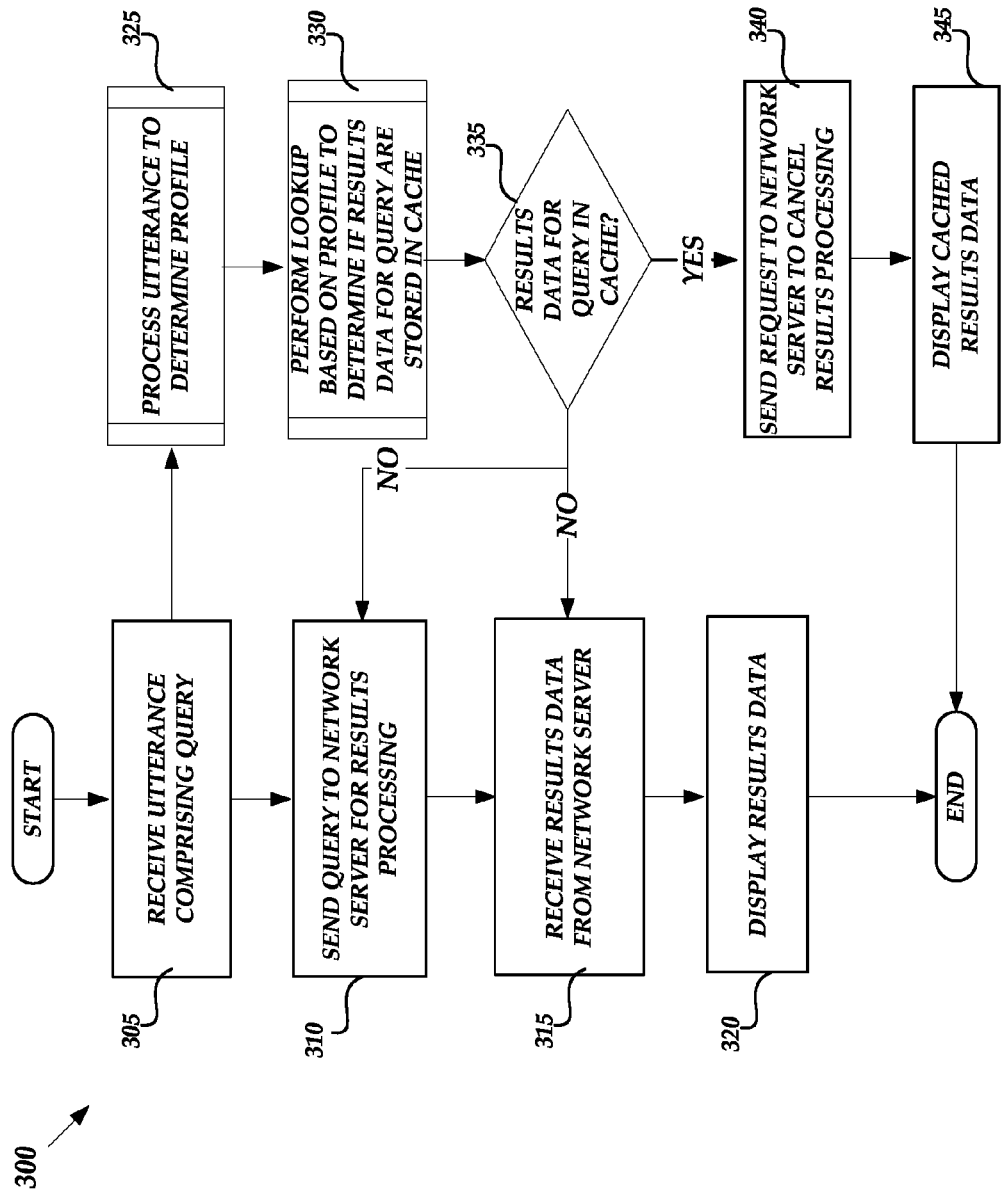
FIG. 3 is a flow diagram illustrating a routine for utilizing a cache for utterance processing to facilitate network based speech recognition, in accordance with one embodiment.

FIG. 3 is a flow diagram 3 illustrating a routine 300 for is a flow diagram illustrating a routine for utilizing a cache for utterance processing to facilitate network based speech recognition, in accordance with one embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 3-5 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 300 begins at operation 305, where the speech recognition application 40 executing on the client computing device 2 receives an utterance comprising a query. For example, a user of the client computing device 2 may utilize one or more of the speech recognition service applications 40 in conjunction with the speech recognition application 40 to initiate a query for the location of a business enterprise, traffic information, directions, weather information, or movie information by speaking (i.e., making an utterance) in the microphone 80 (shown in FIG. 2).

From operation 305, the routine 300 continues to operation 310, where the speech recognition application 40 sends the query from the client computing device 2 to the network sever 70 for results processing.

From operation 305, the routine 300 also branches to operation 325 where the speech recognition application 40 processes the received utterance to determine a profile (i.e., a speech profile). A routine for processing the received utterance to determine a speech profile will be described in greater detail below in the discussion of FIG. 4. It will be appreciated that in accordance with various embodiments, the operations 310 and 325 may occur in parallel (i.e., nearly simultaneously) or serially. As an example of parallel operation in accordance with an embodiment, upon sending the query to the network server 70 at operation 310, the speech recognition application 40 may also process the utterance containing the query to determine the speech profile. As an example of serial operation, in accordance with an embodiment, the routine 300 may first proceed from operation 305 to operation 310 where the speech recognition application 40 may send the query to the network sever 70 for results processing and wait a predetermined time period to receive the results data back from the network server 70. If the results data 72 is not received within the predetermined time period, the speech recognition application 40 may then branch to operation 325 and begin processing the utterance to determine a speech profile. As another example of serial operation, in accordance with another embodiment, the routine 300 may first branch from operation 305 to operation 325, where the speech recognition application 40 begins processing the utterance to determine a speech profile, proceed to operations 330 and 335 (discussed below), and then return to operation 310 (if the results data 72 is determined not to be in the cache 42). It will be appreciated that either of the aforementioned serial operations may be utilized depending on a particular application. For example, if there is a high cost associated with using the network server 70 for results processing, then the serial operation beginning at operation 325 may be utilized.

From operation 325, the routine 300 continues to operation 330 where the speech recognition application 40 performs a lookup in the cache 42 based on the speech profile (determined at operation 325) to determine if results data for the query is stored in the cache 42. In particular, the speech recognition application 40 may be configured to generate a Uniform Resource Locator ("URL") to perform the cache lookup. A routine for performing the cache lookup will be described in greater detail below in the discussion of FIG. 5.

From operation 330, the routine 300 continues to operation 335 where the speech recognition application 40 determines further processing based on whether results data for the query is stored in the cache 42 (determined at operation 330). If, at operation 335, the speech recognition application 40 has determined that the results data 72 for the query is not stored in the cache 42, then the routine 300 branches to operation 315 where the speech recognition application 40 waits to receive the results data 72 from the network server 70. Once the results data 72 is received from the network server 70, the routine 300 continues to operation 320. In accordance with an alternative embodiment discussed above (in which the routine 300 first branches from operation 305 to operation 325), if, at operation 335, the speech recognition application 40 has determined that the results data 72 for the query is not stored in the cache 42, then the routine 300 branches to operation 310 where the speech recognition application 40 may send the query to the network sever 70 for results processing and wait a predetermined time period to receive the results data 72 back from the network server 70.

At operation 320, speech recognition application 40 displays the results data 72 received from the network server 70 on the client computing device (i.e., on the display device 85 of FIG. 2). From operation 320, the routine 300 then ends.

Returning now to operation 335, if the speech recognition application 40 has determined that the results data for the query is stored in the cache 42 (i.e., the results data 48 stored on the client computing device 2 satisfies the received query), then the routine 300 continues to operation 340.

At operation 340, the speech recognition application 40 sends a request to the network server 70 to cancel the results processing initiated at operation 310. From operation 340, the routine 300 continues to operation 345.

At operation 345, speech recognition application 40 displays the results data 48 in the cache 42 on the client computing device (i.e., on the display device 85 of FIG. 2). From operation 345, the routine 300 then ends.

It will be appreciated, in accordance with an embodiment, that the routine 300 may be performed when there is no active network connection to the network server 70. In accordance with this embodiment, the results data 72 may have previously been obtained from the server when a network connection between the client computing device 2 and the network server 70 was active.

Figure 4:
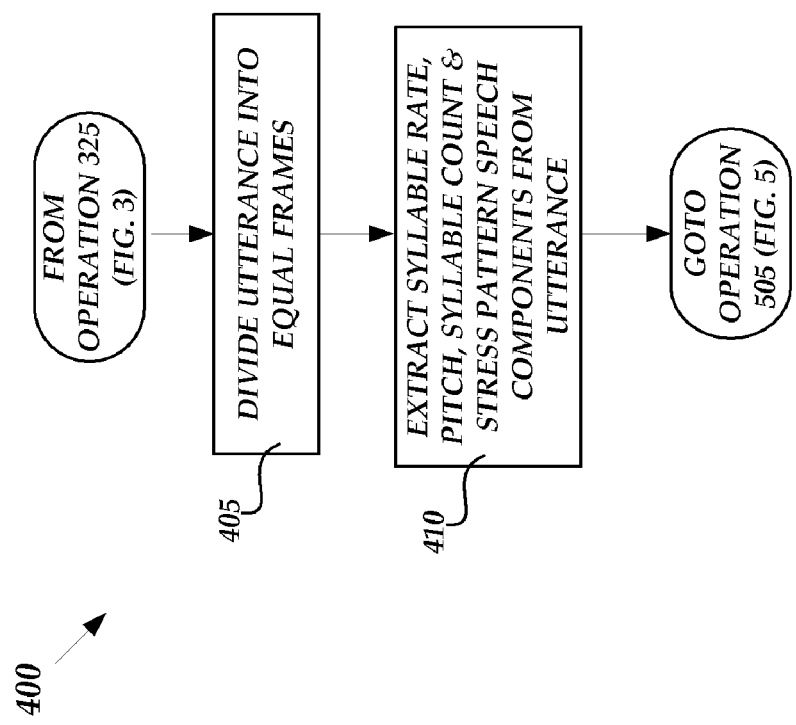
FIG. 4 is a flow diagram illustrating a routine for processing an utterance to determine a speech profile, in accordance with an embodiment.

FIG. 4 is a flow diagram illustrating a routine 400 for processing an utterance to determine a speech profile, in accordance with an embodiment. From operation 325 of FIG. 3 (discussed above), the routine 400 begins at operation 405, where the speech recognition application 40 executing on the client computing device 2 divides the utterance received at operation 305 (and which comprises the query) into equal, overlapping frames. Each frame may comprise, for example, thirty milliseconds of the utterance with a ten millisecond step size or overlap (i.e., a sliding window). Thus, for a first frame covering the first thirty milliseconds of the utterance, the second frame would cover an interval from ten milliseconds to forty milliseconds of the utterance, and a third frame would cover an interval from 20 milliseconds to fifty milliseconds of the utterance. In particular, the speech recognition application 40 may be configured to utilize a sound processing method (e.g., mel-frequency cepstrum) to create a profile of the utterance containing the voice query. As known to those skilled in the art, mel-frequency cepstrum is a well-known method for representing as equally spaced frequency bands on the "mel" scale. Thus, the speech profile may include a number of consecutive and evenly spaced overlapping frames or numerical sequences which comprise the utterance.

From operation 405, the routine 400 continues to operation 410, where the speech recognition application 40 extracts speech components from the utterance received at operation 305. The speech components may include, but are not limited to, syllable rate, pitch, syllable count, and stress pattern. As will be discussed in detail with respect to FIG. 5, the speech recognition 40 may compare (i.e., align) the frames in the speech profile determined at operation 405 and the speech components determined at operation 410 with the frames 46 and the speech components 44 stored in the cache 42 to determine whether the received query corresponds to a previously received query for which results are stored in the cached results data 48. From operation 410, the routine 400 branches to operation 505 of FIG. 5.

FIG. 5 is a flow diagram illustrating a routine 500 for performing a lookup based on a speech profile to determine whether results for a query comprising an utterance are stored in a cache, in accordance with an embodiment. From operation 410 of FIG. 4 (discussed above), the routine 500 begins at operation 505, where the speech recognition application 40 executing on the client computing device 2 aligns the frames in the received utterance with the frames 46 stored in the cache 42. In particular, the speech recognition may be configured to utilize a dynamic programming or dynamic time warping algorithm to align a time series comprising the frames from the utterance with a time series comprising the cached frames 46 to determine similarities.

From operation 505, the routine 500 continues to operation 510 where the speech recognition application 40 extracts the speech components 44 from the cache 42. The speech components 44 are extracted so that they may be compared for similarities with the speech components extracted from the received utterance at operation 410 of FIG. 4 (discussed above).

From operation 510, the routine 500 continues to operation 515 where the speech recognition application 40 compares the speech components extracted from the utterance with the speech components 44 to determine similarities. In particular, and in accordance with an embodiment, the speech recognition application 40 may determine a number to each speech component for comparison. For example, the syllable rate from the received utterance may be represented by a number which is compared with a syllable rate speech component extracted from the cache 42.

From operation 510, the routine 500 continues to operation 520 where the speech recognition application 40 calculates a score based on the frame alignment determined at operation 505 and the speech component comparison determined at operation 515. In particular, the speech recognition application 40 may calculate a score based on the similarity of the frame alignment and the speech component comparison with respect to the cache 42. For example, two instances of the same utterance such as "Call my wife" may be spoken at different rates resulting in two slightly different frame lengths but would result in a higher score than two dissimilar utterances comprising a short frame length and a long frame length. The speech component portion of the score may be made by a one for one comparison of numerical values associated with each of the individual components compared. For example, a syllable rate number extracted from the received utterance which is identical or similar to a syllable rate number from the cache 42 would yield a higher score than two dissimilar syllable rate numbers.

From operation 520, the routine 500 continues to operation 525 where the speech recognition application 40 determines if the results data 48 in the cache 42 should be retrieved for the query based on the score calculated at operation 515. In particular, the speech recognition application 40 may be configured to determine a similarity threshold above which, the received utterance comprising the request is determined to have been previously submitted and for which results for the query are stored in the cache 42. From operation 525, the routine 500 returns to operation 335 of FIG. 3. Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method for utilizing a client-side cache for utterance processing to facilitate network based speech recognition, comprising:
   receiving an utterance comprising a query in the client;
   sending the query from the client to a network server for results processing;
   processing the utterance to determine a profile at the client, wherein processing the utterance to determine a profile at the client comprises:
      dividing the utterance into a plurality of frames comprising a time series of numerical sequences, the plurality of frames comprising the duration of the utterance; and
      extracting at least one speech component from the utterance;
   performing a lookup based on the profile to determine whether results data for the query is stored in the cache, wherein performing a lookup based on the profile to determine whether results data for the query is stored in the cache comprises:
      aligning the plurality of frames in the utterance with a plurality of frames comprising at least one stored utterance in the cache;
      extracting at least one speech component from the at least one stored utterance in the cache;
      calculating a score based on at least one of:
         a degree of the alignment of the plurality of frames in the utterance with the plurality of frames comprising the at least one stored utterance in the cache; and
         a similarity between the at least one speech component extracted from the utterance and the at least one speech component extracted from the at least one stored utterance in the cache; and
      determining whether the results data for the query is stored in the cache based on the score; and
   if the results data is stored in the cache, then displaying the cached results data on the client.

2. The method of claim 1 further comprising, if the results data is stored in the cache, then sending a query to cancel the results processing on the network server.

3. The method of claim 1 further comprising, if the results data is not stored in the cache, then:
   receiving the results data from the network server; and
   displaying the results data from the network server on the client.

4. The method of claim 1, wherein the steps of sending the query from the client to a network server for results processing and processing the utterance to determine a profile at the client occur nearly simultaneously.

5. The method of claim 1, wherein receiving an utterance comprising a query in the client comprises receiving the utterance in an audio capture device.

6. The method of claim 1, wherein extracting at least one speech component from the utterance comprises extracting at least one of a syllable rate, a pitch, a syllable count, and a stress pattern from the utterance and wherein extracting at least one speech component from the at least one stored utterance in the cache comprises extracting at least one of a syllable rate, a pitch, a syllable count, and a stress pattern from the at least one stored utterance.

7. A system for utilizing a client-side cache for utterance processing to facilitate network based speech recognition, the system comprising a client computer, the client computer comprising:
   a memory for storing executable program code; and
   a processor, functionally coupled to the memory, the processor being responsive to computer-executable instructions contained in the program code and operative:
      to receive an utterance comprising a query;
      to send the query to a network server for results processing;
      to process the utterance to determine a profile by:
         dividing the utterance into a plurality of frames comprising a time series of numerical sequences, the plurality of frames comprising the duration of the utterance; and
         extracting at least one speech component from the utterance;
      to perform a lookup based on the profile to determine whether results data for the query is stored in the cache; and
      if the results data is stored in the cache, then to display the cached results data.

8. The system of claim 7, wherein the processor, in performing a lookup based on the profile to determine whether results data for the query is stored in the cache, is further operative:
   to align the plurality of frames in the utterance with a plurality of frames comprising at least one stored utterance in the cache;
   to extract at least one speech component from the at least one stored utterance in the cache;
   to calculate a score based on at least one of:
      a degree of the alignment of the plurality of frames in the utterance with the plurality of frames comprising the at least one stored utterance in the cache; and
      a similarity between the at least one speech component extracted from the received utterance and the at least one speech component extracted from the at least one stored utterance in the cache; and
   to determine whether the results data for the query is stored in the cache based on the score.

9. The system of claim 8, wherein the at least one speech component extracted from the utterance comprises at least one of a syllable rate, a pitch, a syllable count, and a stress pattern and wherein the at least one speech component extracted from the at least one stored utterance in the cache comprises at least one of a syllable rate, a pitch, a syllable count, and a stress pattern.

10. The system of claim 7, wherein if the results data is stored in the cache, then the processor is further operative to send a query to cancel the results processing on the network server.

11. The system of claim 7, wherein if the results data is not stored in the cache then the processor is further operative to:
 receive the results data from the network server; and
 display the results data from the network server on the client.

12. The system of claim 7, wherein the query is sent to the network server for results processing and the utterance is processed to determine the profile nearly simultaneously.

13. A computer-readable storage device comprising computer executable instructions which, when executed on a computer, will cause the computer to perform a method of utilizing a client-side cache for utterance processing to facilitate network based speech recognition, the method comprising:
 receiving an utterance comprising a query;
 sending the query from the client to a network server for results processing;
 processing the utterance to determine a profile at the client, wherein processing the utterance to determine a profile at the client comprises:
  dividing the utterance into a plurality of frames comprising a time series of numerical sequences, the plurality of frames comprising the duration of the utterance; and
  extracting at least one speech component from the utterance, wherein the steps of sending the query from the client to a network server for results processing and processing the utterance to determine a profile at the client occur nearly simultaneously;
 performing a lookup based on the profile to determine whether results data for the query is stored in the cache;
 if the results data is stored in the cache, then
  sending a query to cancel the results processing on the network server; and
  displaying the cached results data on the client;
 if the results data is not stored in the cache, then
  receiving the results data from the network server; and
  displaying the results data from the network server on the client.

14. The computer-readable storage device of claim 13, wherein performing a lookup based on the profile to determine whether results data for the query is stored in the cache comprises:
 aligning the plurality of frames in the utterance with a plurality of frames comprising at least one stored utterance in the cache;
 extracting at least one speech component from the at least one stored utterance in the cache;
 calculating a score based on at least one of:
  a degree of the alignment of the plurality of frames in the utterance with the plurality of frames comprising the at least one stored utterance in the cache; and
  a similarity between the at least one speech component extracted from the utterance and the at least one speech component extracted from the at least one stored utterance in the cache; and
 determining whether the results data for the query is stored in the cache based on the score.

15. The computer-readable storage device of claim 14, wherein extracting at least one speech component from the utterance comprises extracting at least one of a syllable rate, a pitch, a syllable count, and a stress pattern from the utterance.

16. The computer-readable storage device of claim 14, wherein extracting at least one speech component from the at least one stored utterance in the cache comprises extracting at least one of a syllable rate, a pitch, a syllable count, and a stress pattern from the at least one stored utterance.

* * * * *